United States Patent [19]
Gross

[11] Patent Number: 5,377,114
[45] Date of Patent: Dec. 27, 1994

[54] FUEL OIL METER VERIFICATION AND USAGE MONITORING MEANS FOR HEATING SYSTEMS

[76] Inventor: Lawrence Gross, 939 Monroe La., Hewlett Neck, N.Y. 11598

[21] Appl. No.: 928,781

[22] Filed: Aug. 13, 1992

[51] Int. Cl.⁵ .......................................... G06F 15/20
[52] U.S. Cl. ................................................ 364/465
[58] Field of Search .................. 235/94 R, 94 A; 364/465

[56] References Cited

U.S. PATENT DOCUMENTS

| | | | |
|---|---|---|---|
| 4,035,772 | 7/1977 | Abe et al. | 340/151 |
| 4,075,607 | 2/1978 | Abe | 340/152 R |
| 4,287,508 | 9/1981 | Arita et al. | 340/150 |
| 4,400,783 | 8/1983 | Locke, Jr. et al. | 364/483 |
| 4,418,333 | 11/1983 | Schwarzbach et al. | 340/310 A |
| 4,697,182 | 9/1987 | Swanson | 340/870.02 |
| 4,783,623 | 11/1988 | Edwards et al. | 324/156 |
| 4,803,632 | 2/1989 | Frew et al. | 364/464.04 |
| 4,862,493 | 8/1989 | Venkataraman et al. | 379/107 |

*Primary Examiner*—Edward R. Cosimano
*Attorney, Agent, or Firm*—Galgano & Burke

[57] ABSTRACT

A meter verifies the amount of fuel oil being delivered through a pulse transmission to a computer which then records the time, date and quantity of delivery. Through a pad keyboard on the computer or through a remote transmission, entry can be made of the per gallon/liter fuel cost together with a separate entry covering the tax charges of any single delivery. The computer also records the time and date when the heating system is operational and contains a flow meter to track and record the amount of fuel being consumed by the burner system during operation. The computer stores these details for either on-site printouts or through remote transmission while also providing calculations of consumption and comparison cost analysis of all deliveries and usage within any required timeframe.

4 Claims, 3 Drawing Sheets

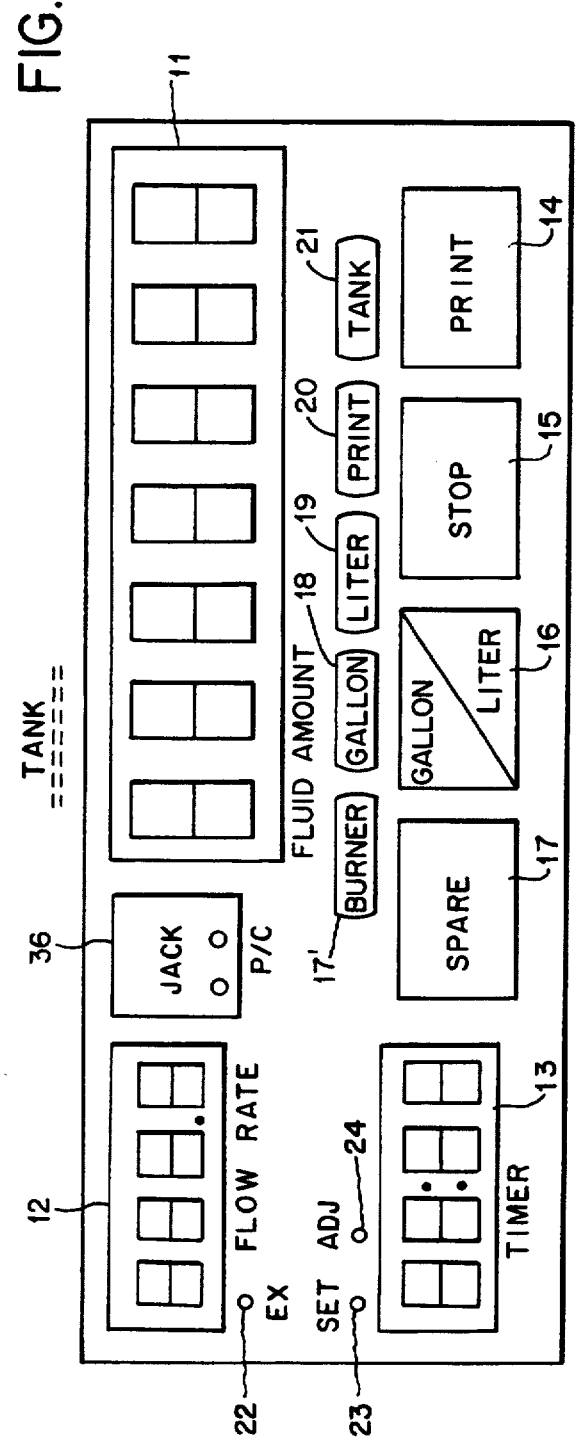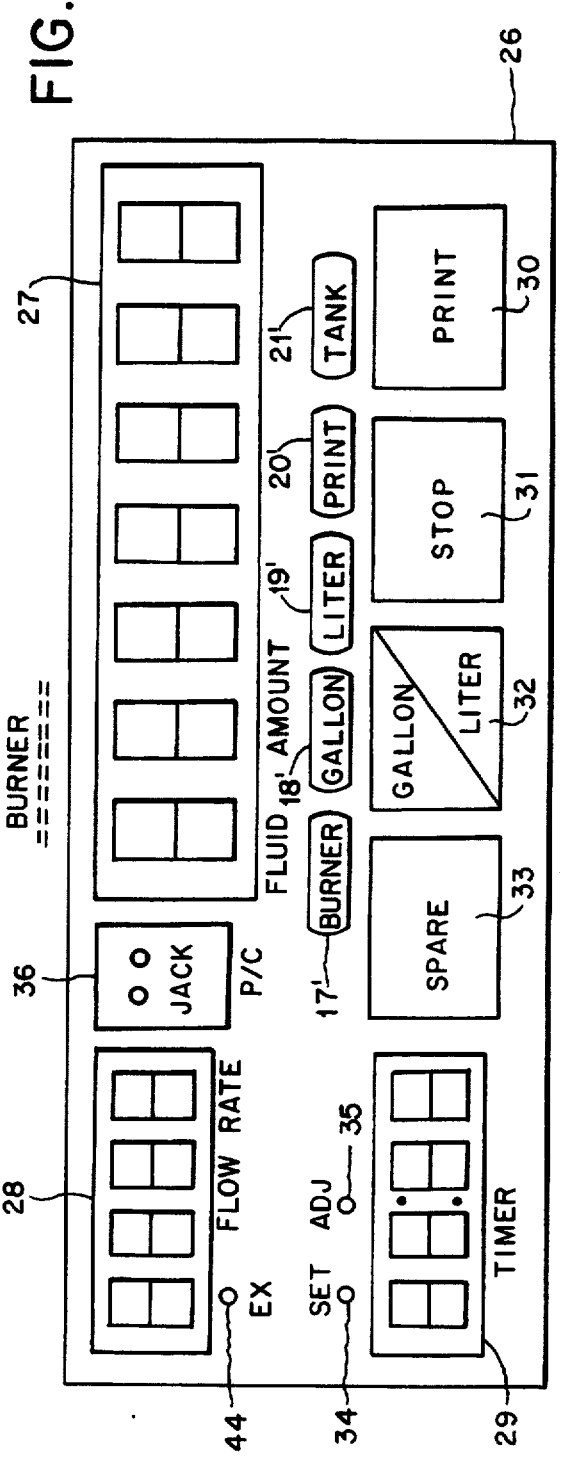

FUEL OIL METER VERIFICATION AND USAGE MONITORING MEANS FOR HEATING SYSTEMS

This invention relates to fuel oil meter verification and usage monitoring means and, more particularly, to a system and device which verifies, track and records the receipt and usage of fuel oil used within heating systems, with remote transmitting and receiving capabilities.

BACKGROUND

There is a need for a system which verifies, tracks and records the receipt and usage of fuel oil used within heating systems with remote transmitting and receiving capabilities to control costs and eliminate mistakes and fraud.

| PRIOR ART | |
|---|---|
| 4,035,772 | 4,697,182 |
| 4,075,607 | 4,783,623 |
| 4,287,508 | 4,862,493 |

None of the above prior art shows Applicant's invention.

THE INVENTION

A meter verifies the amount of fuel oil being delivered through a pulse transmission to a computer which then records the time, date and amount delivered. Through a pad keyboard on the computer or through a remote receipt, entry can be made of the cost of fuel per gallon, together with a separate entry covering the tax charges of that single delivery. The system also records and tracks the time and date when the heating unit is running and contains a flow meter to track and record the amount of fuel being consumed by the burner system during operating.

The computer stores these details for either on-site printout or through remote transmission while also providing consumption and cost analysis comparisons of all deliveries and usage within any required time frame.

The system is designed for unsupervised deliveries, and to eliminate miscalculations or fraud while also providing assurances that the heating system is properly serviced or operating within the manufacturer's recommended specifications.

OBJECTS OF THE INVENTION

A principal object of the invention is to provide new and improved fuel meter verification and usage monitoring means.

Another object of the invention is to provide a new and improved system which verifies, tracks and records the receipt and usage of fuel oil used within heating systems with remote transmitting and receiving capabilities.

Another object of the invention is to provide new and improved fuel oil meter verification and usage monitoring means comprising a meter, connected to verify the amount of fuel oil being delivered; a computer, connected to the meter, which then records the time, date and amount delivered; means connected to the computer to enter the cost of fuel per gallon of that single and record and track the time and date when the heating unit is running; and a meter connected to the computer to track and record the amount of fuel being consumed by a burner system during operation.

These, and other objects of the invention, will be apparent from the following specification and drawings:

BRIEF DESCRIPTION OF DRAWINGS

FIG. 2 is a schematic block diagram of the tank front panel.

FIG. 3 is a schematic block diagram of the burner front panel.

FIG. 1 shows a block diagram of the system. Fuel oil is delivered through meter 1 to tank 3. Meter 1 is connected to transmit information to computer 2. Meter 1 is conventional. My system will use any current fuel oil meter that is produced locally within the states. This meter is exactly the same type used on the fuel oil delivery trucks to calculate delivery charges and fuel totals.

Figure 1:
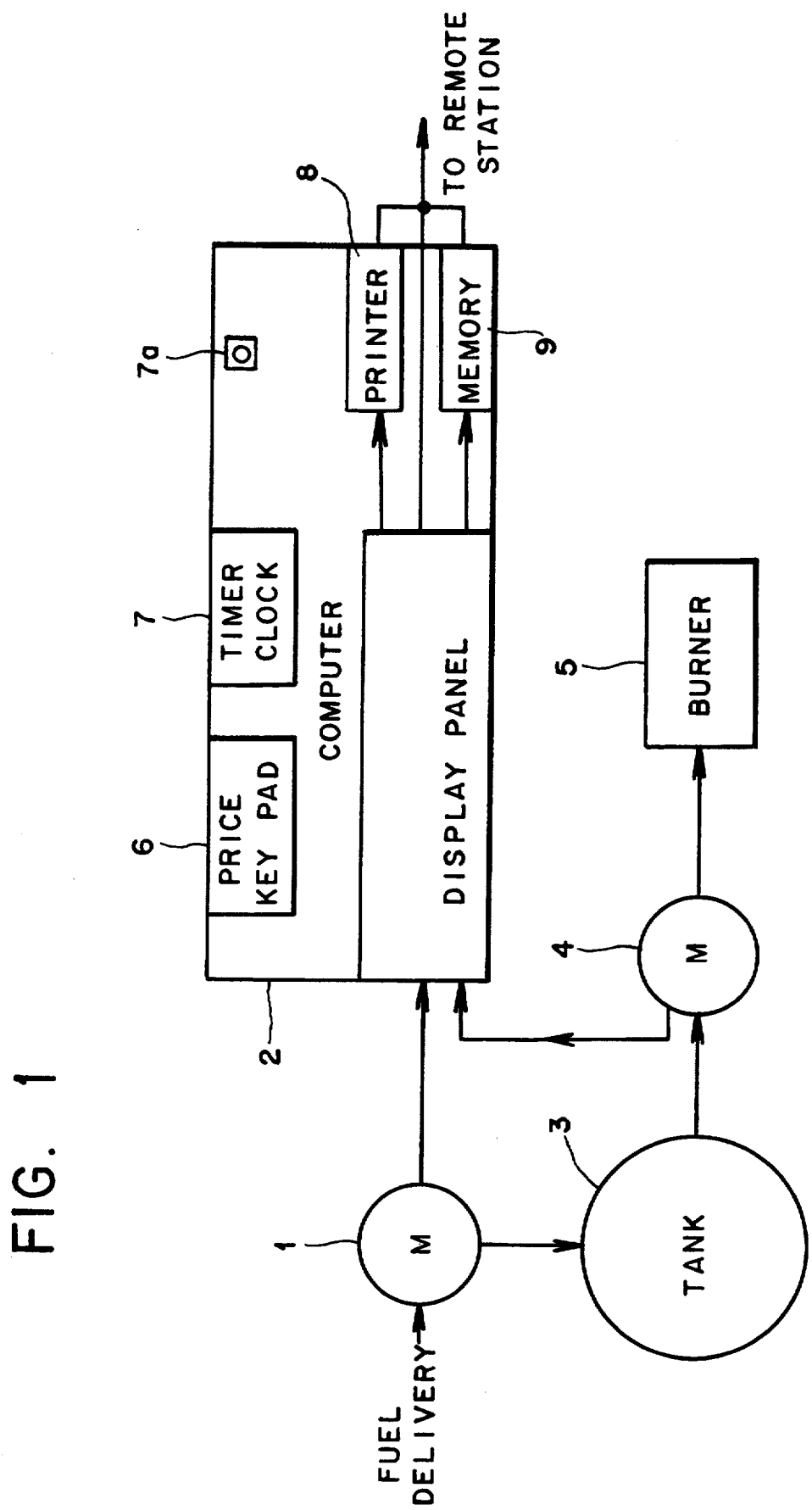
FIG. 1 is a schematic block diagram of an embodiment of the invention.

The meter I use is made by "Liquid Controls", located in Skokie, Ill. However, we could also use those made by Smith Meter, Badger Meter, Rossmount, etc., etc.

The computer 2 may be conventional, for instance; as manufactured by Patent Industrial Company, Taiwan.

Price is inserted into the computer 2, by key pad 6.

Timer-clock 7 inserts date and time information into the computer.

Meter 4 measures flow from tank 3 to burner 5 and feeds this information to computer 2.

Computer 2 has three outputs to printer 8, to memory 9 and to remote locations.

The system will operate with gas fuel with appropriate meters.

FIG. 2 shows tank display.

FRONT PANEL

Fluid Amount Screen: 11 To display receiving fluid amount in gallon or liter, there are seven digits displays, when the amount is shown in LITERS there are seven digits of integer, while the amount is shown in GALLON, there will be six digits of integer and one digit of fraction.

Flow Rate Screen: 12 To constantly indicate the flow rate (gallon/liter PER MINUTE) in three digits of integer and one digit of fraction. (No matter in gallon or liter).

Timer Screen: 13 To provide timing date (date & time) for all the pumping records. When the meter is on, it constantly displays current time in hour:minute. Before using the meter, the timer must be correctly set in order to provide accurate timing data on all the printouts. The approximate error for the timer is 0.1 second monthly.

BUTTON SWITCHES: 14–17

All the buttons will alarm "Beep" sound when pressed.

"PRINT"—14 To print out the amount of the received fuel oil on receipt, the unit of fluid will depend on which of the two (Gallon or Liter) is chosen. This button must be pushed FOUR (4) TIMES CONTINUOUSLY to make the printout, the design is to avoid unexpected printing.

"STOP"—15 To stop the printing mode, set the meter back to stand-by condition.

"GALLON/LITER: 16 To choose the fluid amount to be shown in gallon or liter.

"SPARE BUTTON": 17 Spare for future need.

LED LAMPS

There are five LED lamps 17-21 on the top of the buttons to indicate the mode that the meter is on, they are: BURNER, GALLON, LITER, PRINT, TANK, when the mode is chosen by pushing the button switch, the LED lamp will go on.

ADJUSTMENT BUTTONS

"EX"22 To reset the fluid amount screen to zero, the moment this button is pushed, the figure (fluid amount) is dumped into memory. In order to avoid the screen to be reset to zero inadvertently, this button is set behind the front panel.

"SET" 23 "ADJ": To adjust the timer clock:

"SET" 23 : To select the item to be adjusted, the items are to be shown in the sequence of 1st- YEAR:MONTH, 2nd-DATE:HOUR, 3rd- MINUTE:SECOND, the selected item will begin flickering.

"ADJ"24: To adjust the flickering item to desired figure. When the adjustments are completed, press "SET" button one time, the clock will constantly indicate the current time in HOUR:- MINUTE (00:00).

P/C JACK: 36 is used to connect Personal Computer 2 by standard computer and telephone jack RS232 to operate the data transfer.

FIG. 3 shows

FRONT PANEL 26 of burner which has the following controls and displays:

Fluid Amount Screen: 27 To display consumed fluid amount in gallon or liter. There are seven digits displays, and no matter the gallon or liter used, they are always to be shown in five digits of integer and 2 digits of fraction and the displays figures will always remain and accumulated for instant reading.

Flow Rate Screen: 28 To constantly indicate the HOURLY flow rate in two digits of integer and two digits of fraction (No matter in gallon or liter). The error of the flow rate is less than 1%.

Timer Screen: 29 Same as "TANK" program. FIG. 2

BUTTON SWITCHES: 30-33

Same as "TANK" program FIG. 2 but the "PRINT" is to print out the CONSUMED FLUID AMOUNT LED LAMPS: 17', 18', 19', 21' Same as "TANK" program. FIG. 2

ADJUSTMENT BUTTONS

"EX"—44 To print out the record that the flow speed is over the PRESET flow speed. In order to avoid unnecessary printing, this button is behind the front panel and must be pushed three times to make the extra flow record printout.

"SET" 34, "ADJ" 35—same as "TANK" program, FIG. 2

P/C JACK—36 Same as "TANK" program, FIG. 2.

Figure 4:
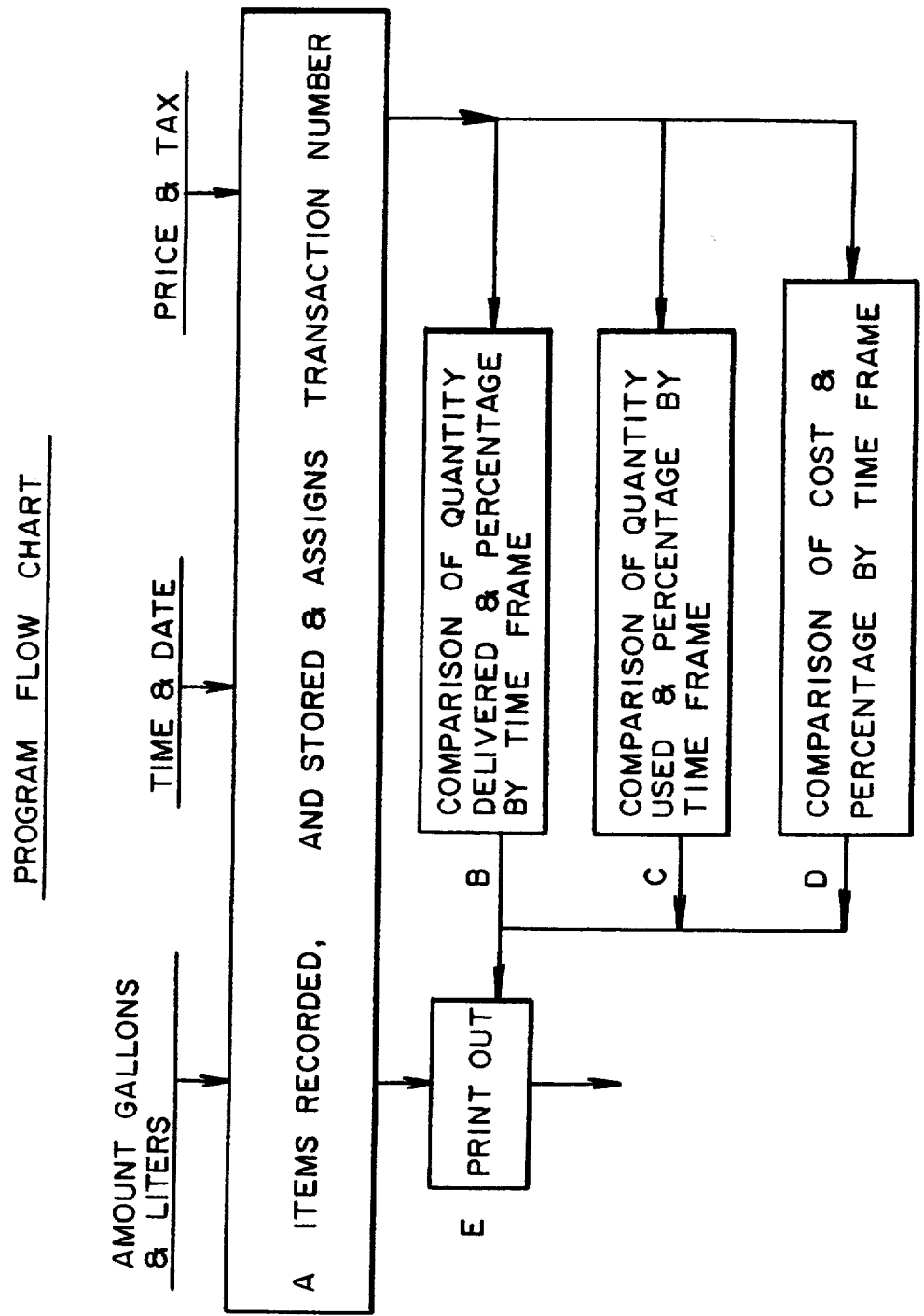
FIG. 4 is the computer flow diagram.

FIG. 4 shows a typical Program Flow Chart having the following functions:

A. Items recorded, amounts stored & assigns location and transaction number.

B. Comparison of quantity delivered & percentage by time frame.

C. Comparison of quantity used & percentage by time frame.

D. Comparison of cost & percentage by time frame.

E. Print out.

One computer unit will simultaneously be able to handle:

1. The fuel meter readings
2. The burner operational time.
3. The burner fuel consumption and hourly flow rate.

However, based upon what a building or homeowner may require, we can carve out from the computer any of the programs which they might not require, or which they cannot afford.

In other words, we can have the unit programmed only to calculate those programs which are of prime concern to the buyer.

OPERATION

Meter 1

1. Verifies the amount of fuel being received into holding tanks as confirmation of the amount charged by the fuel oil delivery service.
2. Preferably contains an air separator to insure that the flow of air through the delivery hose lines is not being metered as fuel.
3. Preferably contains a filter to insure neither residue nor heavy parts are transferred or pumped into the heating system by the fuel delivery service, and
4. Preferably contains a spring check valve to insure against overspillage or syphoning from holding tank.

Computer 2 has:

1. A pulsar to transfer the analog meter readings to a digital pulse for acceptance by the computer.
2. A telephone line with RS 232 port to either accept or transmit data to and from remote area computers through telephone lines.
3. A printer 8 to provide on-site readouts of deliveries and analysis.
4. A pad keyboard 6 is connected to input fuel and tax costs together with invoice numbers and details supplied by the fuel oil delivery company.
5. A continental clock and calendar 7 is connected to input to maintain and record fuel deliveries and fuel burner consumption during burner operation with a battery backup. Flow Meter 4 which is conventional.

Measures the amount of fuel being consumed by the burner 5 during operation and has a pulsar to feed to the computer 2 the flow meter readings.

It is claimed:

1. Fuel oil meter delivery verification and usage monitoring means for a heating unit comprising:

a first meter, which is not part of a delivery vehicle, and connected to an inlet of a storage tank to verify the amount fuel oil being delivered to the tank, a computer, connected to the first meter, to receive information concerning the time, date, amount of fuel oil delivered and means to enter information concerning the cost of fuel per gallon of the fuel being delivered at that time and to record and track the time and date when the heating unit is running, and a second meter connected between the tank and the heating unit and to the computer to track and record information concerning the amount of fuel being consumed by the heating unit during operation.

2. Apparatus as in claim 1, wherein the fuel is gas, and the meters are gas meters.

3. Apparatus as in claim 1, wherein the computer stores said information for either on-site printout or through remote transmission while also providing consumption and cost analysis comparisons of all deliveries and usage within any required time frame.

4. Apparatus as in claim 2, wherein the computer monitors unsupervised deliveries to eliminate miscalculation or fraud while also providing information assuring that the heating system is operating within the manufacturer's recommended specifications.

* * * * *